Nov. 4, 1952 R. L. McNUTT 2,616,972

TELEPHONE OPERATED LIGHTING MEANS

Filed Aug. 30, 1948

RALPH L. McNUTT
INVENTOR

BY Herbert J. Brown

ATTORNEY

Patented Nov. 4, 1952 2,616,972

UNITED STATES PATENT OFFICE 2,616,972

TELEPHONE OPERATED LIGHTING MEANS

Ralph L. McNutt, Fort Worth, Tex.

Application August 30, 1948, Serial No. 46,782

1 Claim. (Cl. 179—2)

This invention relates to lights operated by telephones, and has for its object the provision of a construction and arrangement whereby a light energized by an ordinary house circuit may be turned on by the ringing of a telephone.

A particular object of the invention is to provide a unit for the referred to purpose which may be easily and conveniently connected with a telephone, or, in a modified form of construction, operated by the telephone without any electrical connections with the latter.

Another object of the invention is to provide an inconspicuous housing containing apparatus and mechanism for the referred to purposes on which the base of a hand telephone rests.

Another object of the invention is to provide manual switch means for energizing the light independently of the telephone when so desired.

The present invention will be particularly beneficial to doctors, nurses, and others who receive calls 24 hours a day. When the telephone rings, the light energized by the house circuit is immediately turned on, thereby lighting the room to enable the person answering the telephone to readily find and answer the same.

The foregoing and other objects of the invention will become apparent from the following description of the accompanying drawings, wherein.

Figures 1, 2:
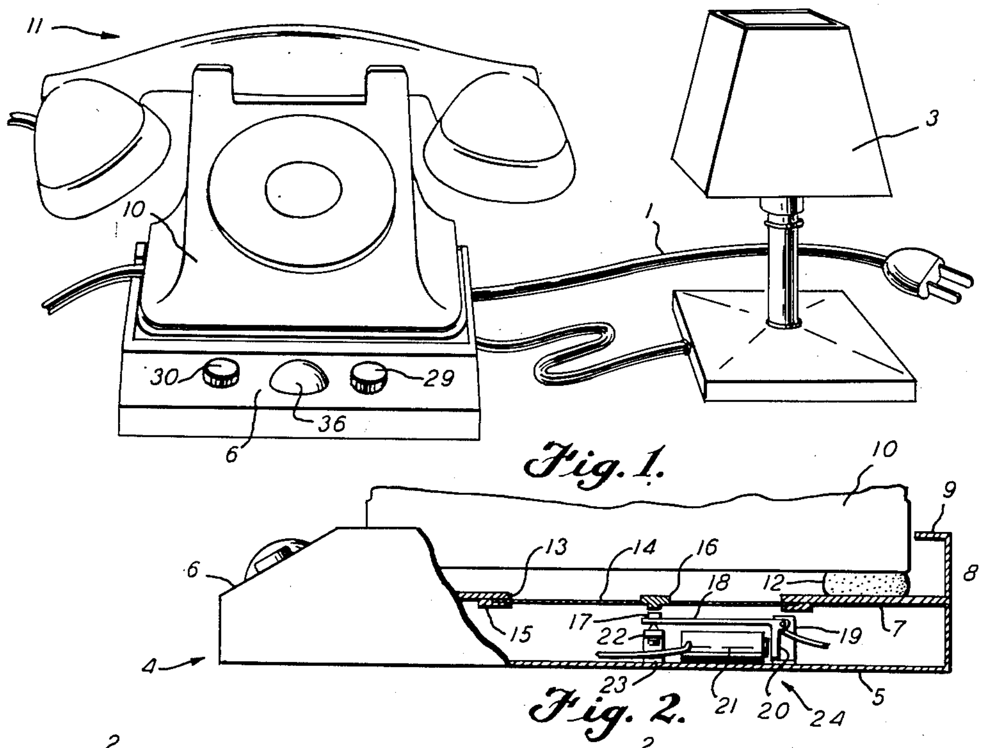
Figure 1 is a perspective view of a hand telephone mounted on a base or housing enclosing either of the herein described forms of the invention, and showing a bedside lamp or the like connected therewith.
Figure 2 is a broken side elevational and sectional view of the housing and telephone illustrated in Figure 1, and showing a diaphragm and mechanism for energizing the light.
Figure 5:
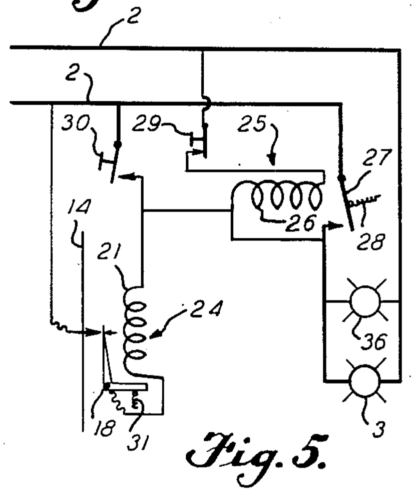
Figure 5 is a wiring diagram of the form of the invention illustrated in Figure 2.

The form of the invention illustrated in Figures 2 and 5, includes an extension cord 1 for connection with a housing circuit 2 for energizing a bedside light 3, or the like. The mechanism of the invention is enclosed in a rectangular housing 4 having a bottom 5, an inclined panel 6 along its forward side, and a horizontal support 7 within said housing. The sides 8 of the housing 4 extend upwardly where they are inwardly flanged, as at 9, to accommodate and receive the base 10 of a hand telephone 11. The cushioned feet 12 of the telephone base 10 rests upon the horizontal support 7. An opening 13 in the support 7 is covered by a diaphragm 14 secured in place by means of an annular ring 15 therearound and attached, as by spot welding, to the said horizontal support. The center of the diaphragm is provided with a contact 16 for coaction with a contact 17 on an armature 18 pivotally supported on a bracket 19 secured to the housing base 5. The armature 18 includes an arm 20 integral therewith and at a right angle with the length thereof for coaction with the end of a coil 21. The contact 17 of the armature 18 is supported on a contact point 22 of insulating material mounted on a bracket 23 secured to the housing base 5. The armature 18, coil 21, and their associated parts form an actuating relay generally designated by the numeral 24. Within the housing 4, and indicated in Figure 5, there is another relay 25, the coil 26 of which is connected in parallel with the house circuit 2, and the switch 27 of the same is installed in one line of the said house circuit. The relay 25 is spring actuated (the spring 28 being illustrated diagrammatically in Figure 5) to normally maintain said relay in its opened position. A manual switch 29 is connected between the coil 26 and its connection with the house circuit 2. Similarly, another manual switch 30 is connected with the other end of the coil 26 and the other lead of the house circuit 2. One end of the coil 21 is connected with the other coil 26, as shown only in Figure 5. The diaphragm 14 and a spring 31 for maintaining the armature 18 in an opened position are also diagrammatically illustrated in Figure 5.

Figure 4:
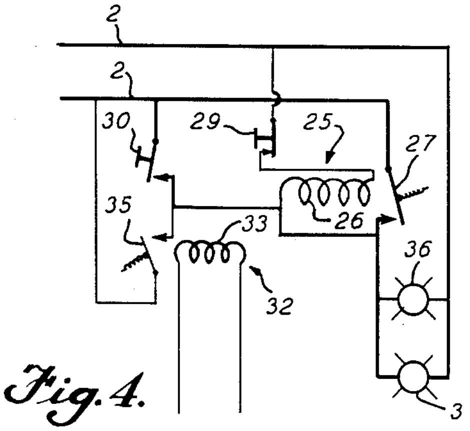
Figure 4 is a wiring diagram of the form of the invention illustrated in Figure 3.
Figure 3:
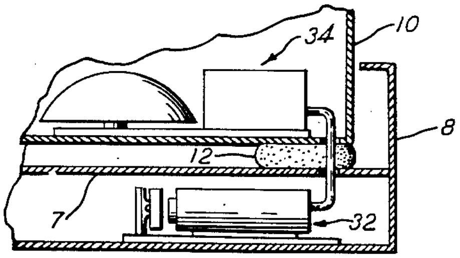
Figure 3 is a broken sectional view similar to Figure 2, and illustrating a means electrically connected with the telephone ringing circuit for energizing the light.

The form of the invention illustrated in Figures 3 and 4 is similar to the one already described, but differs in that the actuating relay 32 has its coil 33 electrically connected with the bell mechanism 34 mounted in the telephone base 10. The spring actuated switch 35 of the relay 32 is normally open, but is arranged for connection with a relay 25, as previously described, connected in parallel with the house circuit 2. It will be noted in the diagram that the actuating switch 35 is connected with one of the leads of the house circuit 2 and that a manual switch 30, such as previously described, is employed between the last referred to lead of the house circuit 2, and the end of the coil 26 of the relay 25 is connected in parallel with said house circuit and arranged for opening one of the leads of the latter. The other end of the coil 26 is connected with the lead 2 other than the lead connected with the closing switch 30. The arrangement illustrated in Figure 4 includes the described light 3, the switch 27 of the house circuit relay 25, and the described connection between the actuating relays 24 or 32. Both forms of the invention may include a pilot light in the house circuit 2, preferably mounted on the housing panel 6, and arranged to operate simultaneously with the bedside lamp 3. Similarly, the manual switches 29 and 30 may be mounted on the panel 6.

Reference is now made to the operation of the form of the invention illustrated in Figures 2 and 5. When the telephone bell mechanism 34 rings, a vibration is set up causing the diaphragm 14 to touch the contact 17 of the actuating relay 24. By reason of the connection between the coil 21 and the actuating relay with the coil 26, the house circuit relay switch 27 is closed, thus turning on the light 3 and the pilot light 36. By reason of the described construction of the armature 18 of the actuating relay 24, and the action of the coil 21 on the leg 20 of the same, the contact 17 is immediately moved against the diaphragm contact 16. As soon as the switch 27 closes, the actuating relay 24 is no longer energized, thus opening the diaphragm and relay contacts 16 and 17. The lamp 3 and pilot 36 may be turned off by opening the manual switch 29. Similarly, the actuating relay 24 may be bypassed and the lights 3 and 36 may be turned on by closing the manual switch 30.

Referring now to Figures 3 and 4, the operation of the second described form of the invention is carried out when the telephone bell ringing circuit is energized. The coil 33 connected with the bell circuit closes the actuating relay switch 35 and thus completes connection between one lead of the house circuit 2 and the coil 26 of the house circuit relay 25. Energizing the coil 26 causes the relay switch 27 to close and energize the lights 3 and 36. The actuating relay 32 may be bypassed by closing the normally opened manual switch 30. The normally closed manual switch 29 may be opened when desired to turn off the lights 3 and 36.

The described forms of the invention are not restrictive, but may be made in many ways within the scope of the appended claim.

What is claimed is:

In combination with a telephone having a bell signal mechanism in the base thereof and with a house circuit having an electric lamp connected in electrical circuit therewith, a housing having an upper surface adapted to support said telephone base thereon; an electrically nonconductive diaphragm within said upper housing surface and positioned beneath and vibrationally responsive to the ringing of said bell signal mechanism when said telephone base is positioned on said upper housing surface; electrically conductive means included in said diaphragm and connected to one lead of said house circuit; a relay including a coil and a pivoted armature as a part of the switch mechanism thereof, said armature being positioned adjacent said diaphragm normally in spaced relation thereto and adapted for contact with said conductive means when said diaphragm vibrates and also adapted for contact with said conductive means when said armature is pivotally moved, and being electrically connected to said coil, said coil being also electrically connected at its opposing terminal to a second lead of said house circuit and adapted to pivotally move said armature to cause it to bear against said conductive means with the flow of current through said coil; a switch electrically connected in series with said house circuit between said lamp and the source of current supply therefor; a second coil electrically connected in parallel with said house circuit between said lamp and the last referred to switch, and also electrically connected in series with said first-named coil at said opposing terminal and in series with said armature, both of said coils and said armature thus connected being electrically connected in parallel with said house circuit between said source of current supply and the last referred to switch when said armature is in contact with said conductive means, and said second coil being adapted to close the last referred to switch with the flow of current through said second coil.

RALPH L. McNUTT.

REFERENCES CITED

The following references are of record in the file of this patent:

UNITED STATES PATENTS

| Number | Name | Date |
|---|---|---|
| 764,792 | Bolan | July 12, 1904 |
| 1,113,537 | Boze | Oct. 13, 1914 |
| 1,701,288 | Wertheimer | Feb. 5, 1929 |
| 2,363,145 | Robbins | Nov. 21, 1944 |
| 2,428,007 | Boardman | Sept. 30, 1947 |